United States Patent
Hofmann

(10) Patent No.: US 7,383,739 B2
(45) Date of Patent: Jun. 10, 2008

(54) MAGNETOINDUCTIVE FLOWMETER HAVING AN ELECTRODE WITH AN ELECTROCONDUCTIVE DIAMOND COATING

(75) Inventor: Friedrich Hofmann, Straelen (DE)

(73) Assignee: Krohne Messtechnik GmbH Co. KG, Duisburg (DE)

( * ) Notice: Subject to any disclaimer, the term of this patent is extended or adjusted under 35 U.S.C. 154(b) by 0 days.

(21) Appl. No.: 11/409,876

(22) Filed: Apr. 24, 2006

(65) Prior Publication Data

US 2006/0236780 A1 Oct. 26, 2006

(30) Foreign Application Priority Data

Apr. 25, 2005 (DE) .................... 10 2005 019 418

(51) Int. Cl.
*G01F 1/58* (2006.01)
(52) U.S. Cl. .................................... 73/861.12
(58) Field of Classification Search ............. None
See application file for complete search history.

(56) References Cited

U.S. PATENT DOCUMENTS

| | | | |
|---|---|---|---|
| 3,786,680 A * | 1/1974 | Wyatt et al. ............. 73/861.12 |
| 4,296,636 A | 10/1981 | Mannherz |
| 4,517,846 A | 5/1985 | Harrison et al. |
| 4,565,619 A * | 1/1986 | Gardner et al. ............ 204/400 |
| 4,912,838 A * | 4/1990 | Goto et al. ................ 29/602.1 |
| 5,247,837 A * | 9/1993 | Corpron ................. 73/861.12 |
| 5,307,687 A * | 5/1994 | Arai et al. ............... 73/861.12 |
| 6,375,829 B1 * | 4/2002 | Shevchenko et al. ..... 205/793.5 |
| 6,802,223 B2 * | 10/2004 | Nakatani et al. ......... 73/861.12 |
| 2006/0144702 A1 * | 7/2006 | Seki et al. .................. 204/280 |

FOREIGN PATENT DOCUMENTS

DE 4105311 8/1992
WO WO 9855837 A1 * 12/1998

* cited by examiner

*Primary Examiner*—Harshad Patel
(74) *Attorney, Agent, or Firm*—Cesari and McKenna, LLP

(57) ABSTRACT

A magnetoinductive flowmeter includes a measuring tube containing an electrode that is provided with an electroconductive diamond coating, as a result of which the galvanic contact between the electrode and the medium that flows through the measuring tube is indirect, i.e. via the electroconductive diamond coating. This produces an electrode that offers mechanical strength and is conducive to interference-free measuring signals. A method for producing the flowmeter is also disclosed.

15 Claims, 1 Drawing Sheet

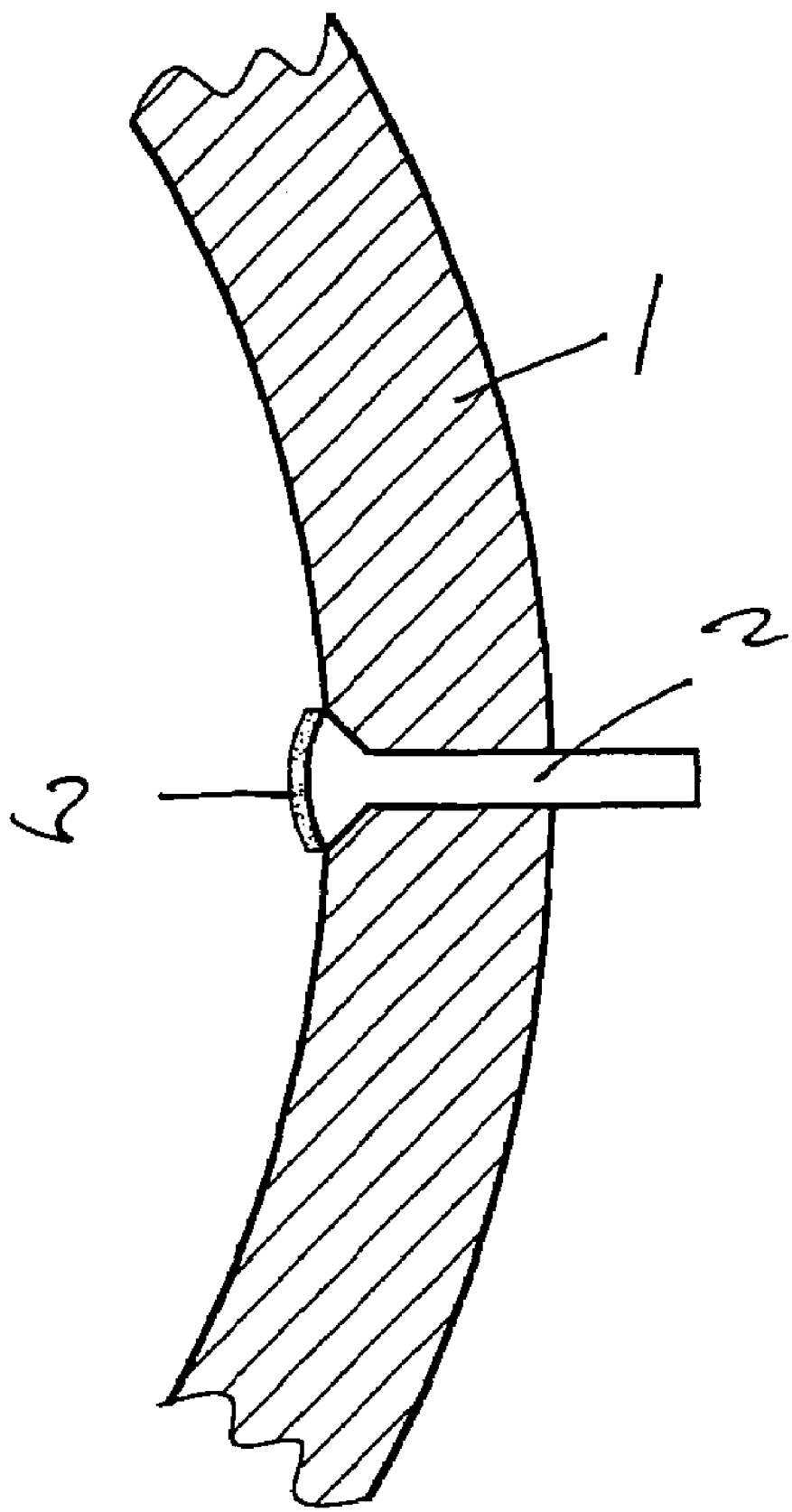

MAGNETOINDUCTIVE FLOWMETER HAVING AN ELECTRODE WITH AN ELECTROCONDUCTIVE DIAMOND COATING

This invention relates to a magnetoinductive flowmeter incorporating a measuring tube through which passes a flowing medium, as well as an electrode that is provided in the measuring tube and is in galvanic contact with the flowing medium. The invention further relates to a method for producing a magnetoinductive flowmeter, whereby an electrode is mounted in a measuring tube, serving to conduct a flowing medium, in such fashion that the electrode is in galvanic contact with the flowing medium.

BACKGROUND OF THE INVENTION

Magnetoinductive flowmeters are well-known from prior art, described, for example, in "K. B. Bonfig, Technische Durchflussmessung (industrial flow measurements), $3^{rd}$ edition, Vulkan-Verlag, Essen, 2002, pp. 123-167". The underlying concept of a magnetoinductive flow-measuring device goes all the way back to Faraday who in 1832 proposed using the principle of electrodynamic induction for flow-rate measurements.

According to Faraday's law of induction, a flowing medium that contains charge carriers and travels through a magnetic field will produce an electric field intensity perpendicular to the direction of flow and perpendicular to the magnetic field. A magnetoinductive flowmeter utilizes Faraday's law of induction in that by means of a magnetic-field system containing at least one magnet with typically two field coils a magnetic field is generated and positioned over the cross-sectional area of the measuring tube, which magnetic field includes a magnetic-field component that extends in a direction perpendicular to the direction of flow. Within the magnetic field, each volume element of the flowing medium, containing a certain number of charge carriers, contributes the field intensity created in that volume element to the measuring voltage that can be collected via the electrodes.

One salient characteristic of magnetoinductive flowmeters is the proportionality between the measured voltage and the velocity of the flowing medium through the cross section of the measuring tube, i.e. between the measured voltage and the volume flow. Apart from the electrodes serving to collect the voltage being measured, additional electrodes may be provided, such as zero-flow detection electrodes as well as grounding electrodes especially also in the form of grounding sleeves.

Metal electrodes that are in direct contact with the flowing medium form an electrochemical boundary layer, capable of producing electrochemical direct-current voltages whose order of magnitude may be several 100 mV. These electrochemical direct-current voltages can change quite rapidly, for instance as a function of variations in the local flow rate of the medium at the electrodes due to turbulences, of operating-pressure fluctuations, of the pH value of the medium, of the composition of the medium especially while chemical reactions are still going on in the medium, of solid particles carried by or particles suspended in the medium and interfering with the boundary layer on the electrodes, or of solid particles in contact with or indeed impinging on the electrodes. All these factors lead to statistical fluctuations of the electrochemical direct current at the electrodes with amplitudes ranging from a few μV to several 10 mV. These statistical voltage fluctuations are also referred to as random noise.

This random-noise voltage is superimposed on the flow-proportional signal voltage whose signal intensity is typically 0.1 to 1 mV/(m/s), i.e. 0.1 to 1 mV for a flow velocity of one meter per second. It follows that the amplitude of the random-noise voltage may be of the same magnitude as the flow-proportional signal voltage or even well above that. The result may be substantial noise interference with consequently irregular, strongly fluctuating flow-rate readings of the magnetoinductive flowmeter.

That problem has been addressed in the prior art by applying on the surface areas of the electrodes that come in contact with the medium a porous coating consisting of a nonconducting, electrically inert material, for instance a porous ceramic layer. The electrically conductive medium penetrates into these pores, creating a voltaic connection between the medium and the metal of the electrodes and their associated transducer. This has a number of beneficial effects:

The medium that makes contact with the metal of the electrodes is replaced very slowly. This significantly minimizes sudden, measurement-disrupting spikes of the direct-current voltage at the electrodes as a result of an electrochemically heterogeneous medium. Moreover, solid particles carried by the medium are no longer able to penetrate into the electrochemical boundary layer that is now largely protected by the ceramic coating. Solid particles carried by the medium therefore cause significantly less interference than would be the case without that porous ceramic layer.

To be sure, this type of porous ceramic layer has drawbacks of its own. For example, abrasion or physical impact can damage the ceramic layer whenever the medium carries along hard solids. Then, too, the chemical resistance of the ceramic material used is not always adequate. The same is true for the thermal-shock resistance of these ceramic materials. Finally, electrically insulating oils or fats carried by the medium can penetrate into the pores of the ceramic, interrupting the galvanic connection between the medium and the metal electrode.

SUMMARY OF THE INVENTION

It is therefore the objective of this invention to introduce a magnetoinductive flowmeter, and a method for producing a magnetoinductive flowmeter, employing a type of electrode that delivers a highly noise-free flow signal and offers a high level of mechanical resistance.

For a magnetoinductive flowmeter as described at the outset, this objective is achieved by providing the electrode with an electrically conductive diamond coating.

Thus, according to the invention, any direct contact between the medium and the electrode is avoided by coating the electrode with an electroconductive diamond coating. Specifically, in a preferred embodiment of the invention, the electroconductive diamond coating completely covers the area of the electrode that is exposed to contact with the flowing medium.

The result is an electrode for a magnetoinductive flowmeter that is very hard and offers high abrasion resistance as well as a maximum level of chemical stability. In addition, this electrode is electrically and electrochemically inert, with the particular absence of any piezoelectric effect, and there is no or only a minimal build-up of electro-chemical tension.

These advantages notwithstanding it is still possible to produce an electroconductive diamond coating that offers sufficiently high electrical conductivity. Specifically, in a preferred embodiment of the invention, the resistivity of the diamond coating is in the range between $10^{-5}$ and 10 Ωm.

That obviates the need for through-pores in order to establish a galvanic connection from the medium to the electrode.

For producing an electroconductive diamond coating there would be a number of suitable materials. However, the diamond coating in a preferred embodiment of the invention is composed of doped polycrystalline diamonds. Alternatively, the diamond coating may be a doped layer of amorphous diamond-like carbon materials (an ADLC layer).

One preferred embodiment of the invention employs boron as the dopant. Specifically, in a preferred implementation of the invention, the diamond coating is applied by a CVD (chemical vapor deposition) process.

The diamond-coated area of the electrode preferably consists of a metal. Particular preference for the area to which the diamond layer is applied is given to niobium, tantalum or tungsten. These materials display an especially good affinity for a diamond coating applied by a CVD process. Incidentally, it is not necessary for the entire electrode to consist of the material on which the diamond coating is deposited. Specifically, the electrode may be composed of at least two different metals, one of them preferably being one of the aforementioned metals to ensure the desired adhesion of the diamond coating.

With reference to the method described at the outset, the stated objective is achieved by coating the electrode with an electrically conductive diamond layer.

Preferred enhancements of the method according to this invention correspond in analogous fashion to the above-described preferred embodiments of the inventive magnetoinductive flowmeter.

There are numerous different ways in which the magnetoinductive flowmeter according to the invention and the inventive method for producing a magnetoinductive flowmeter can be configured and further enhanced. In this context, attention is invited to the dependent claims and to the following detailed description of a preferred embodiment of the invention with reference to the attached drawing.

BRIEF DESCRIPTION OF THE DRAWINGS

In the drawing, the single FIGURE depicts schematically the measuring tube of a magnetoinductive flowmeter, which measuring tube contains an electrode that has been provided with an electroconductive diamond coating.

DETAILED DESCRIPTION OF AN ILLUSTRATIVE EMBODIMENT

As shown in the drawing FIGURE, the measuring tube 1 of a magnetoinductive flowmeter contains an electrode 2 so positioned as to make galvanic contact with the medium flowing through the measuring tube. However, the electrode 2 proper is not in direct contact with the flowing medium; instead, that contact is indirect, via an electroconductive diamond coating 3 deposited on the surface area of the electrode 2 facing the flowing medium. In the embodiment example of the invention here described, the surface area of the electrode 2 that would otherwise be in direct contact with the flowing medium is completely covered with the electroconductive diamond coating 3. Thus, instead of a direct contact between the medium and the solid particles it carries and the electrode 2, the latter in this case consisting of niobium, there is only an indirect contact, established via the electroconductive diamond coating 3.

In the preferred embodiment of the invention here described, the electrically conductive diamond coating 3 consists of a polycrystalline diamond layer doped with boron and deposited by a CVD process. Boron doping allows for the resistivity parameter of the electroconductive diamond layer 3 to be set within a range from $10^{-5}$ to $10\,\Omega\mathrm{m}$. This produces a coating with the typical properties of diamond, these being chemical inertness, thermal resistance up to at least 600° C. and dimensional stability.

The CVD process is typically applied at a pressure in the range between 10 and several 100 mbar, employing electrically or thermally activated hydrocarbon-containing vapors. For the coating, the electrode 2 is maintained at a temperature between 500° C. and 1000° C., permitting deposition rates of up to several 100 µm/h.

Doping with boron can be performed in several different ways, for instance by vaporizing boron metal or a liquid source of boron such as trialkyl borate. A gas such as diborane can also be used.

The invention claimed is:

1. A magnetoinductive flowmeter, with a measuring tube that conducts a flowing medium and, situated in said measuring tube, an electrode that establishes galvanic contact with the flowing medium, wherein said electrode is provided with an electroconductive diamond coating.

2. The magnetoinductive flowmeter as in claim 1, wherein the electroconductive diamond coating completely covers the surface area of the electrode that comes in contact with the flowing medium.

3. The magnetoinductive flowmeter as in claim 1 or 2, wherein the diamond coating is composed of a doped polycrystalline diamond layer.

4. The magnetoinductive flowmeter as in claim 1 or 2, wherein the diamond coating is composed of a doped ADLC layer.

5. The magnetoinductive flowmeter as in claim 1 or 2, wherein the diamond coating includes a boron dopant.

6. The magnetoinductive flowmeter as in claim 1 or 2, wherein the diamond coating is applied by means of a CVD process.

7. The magnetoinductive flowmeter as in claim 1 or 2, wherein the area of the electrode to which the diamond coating is applied consists of niobium, tantalum or tungsten.

8. The magnetoinductive flowmeter as in claim 1 or 2, wherein the diamond coating exhibits a resistivity in the range from $10^5$ to $10\,\Omega\mathrm{m}$.

9. A method for producing a magnetoinductive flowmeter comprising the steps of providing a measuring tube that conducts a flowing medium, positioning an electrode in said tube so as to come in galvanic contact with the flowing medium, and providing said electrode with an electroconductive diamond coating.

10. The method for producing a magnetoinductive flowmeter as in claim 9, wherein the providing step includes completely covering with the electroconductive diamond coating the surface area of the electrode that comes in contact with the flowing medium.

11. The method for producing a magnetoinductive flowmeter as in claim 9 or 10, including the step of constituting the diamond coating of a doped polycrystalline diamond layer.

12. The method for producing a magnetoinductive flowmeter as in claim 9 or 10, including the step of constituting the diamond coating of a doped ADLC layer.

13. The method for producing a magnetoinductive flowmeter as in claim 9 or 10, including the step of doping the diamond coating with boron obtained in particular by vaporizing boron metal or a liquid source of boron such as trialkyl borate, or in the form of a gas such as diborane.

14. The method for producing a magnetoinductive flowmeter as in claim 9 or 10, including the step of applying the diamond coating by means of a CVD process.

15. The method for producing a magnetoinductive flowmeter as in claim 9 or 10, including the step of using niobium, tantalum or tungsten for the area of the electrode to which the diamond coating is applied.

* * * * *

UNITED STATES PATENT AND TRADEMARK OFFICE
CERTIFICATE OF CORRECTION

PATENT NO. : 7,383,739 B2
APPLICATION NO. : 11/409876
DATED : June 10, 2008
INVENTOR(S) : Friedrich Hofmann It is certified that error appears in the above-identified patent and that said Letters Patent is hereby corrected as shown below:

Title Page; should read;
(73)   Assignee:   Krohne Messtechnik GmbH & Co. KG, Duisburg  (DE)

Signed and Sealed this

Twenty-fifth Day of November, 2008

JON W. DUDAS
*Director of the United States Patent and Trademark Office*